April 14, 1970  F. KLUMPP, JR., ET AL  3,506,950
FOLD-OVER BLADE AND FOLD-OVER BLADE CAPLINE Filed Nov. 22, 1967  2 Sheets-Sheet 1

INVENTORS
FERDINAND KLUMPP, JR.
KERRY HEYMAN
BY
Aurlander + Thomes

ATTORNEYS

United States Patent Office 3,506,950
Patented Apr. 14, 1970

3,506,950
FOLD-OVER BLADE AND FOLD-OVER
BLADE CAPLINE
Ferdinand Klumpp, Jr., Mountainside, and Kerry Heyman, Summit, N.J., assignors to Heyman Manufacturing Company, Kenilworth, N.J., a corporation of New Jersey
Filed Nov. 22, 1967, Ser. No. 685,083
Int. Cl. H01r 33/06, 11/08
U.S. Cl. 339—195
9 Claims

ABSTRACT OF THE DISCLOSURE

A fold-over blade and fold-over blade capline construction allowing the molding of caps on fold-over blades of thin stock in conventional cap cavities with a minimum of plastic outflow through the cavity and the blade folds.

---

Figure 3:
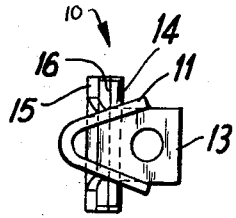

The present invention relates to a capline construction for a fold-over electric contact blade and a thin stock fold-over blade.

In the production of electric contact blades, it has been found advantageous to mold caps around blades which have connected wires. The molding is usually done by injection. A cap can easily be molded around cord sets of blades in a mold. The blades may be manually positioned in the mold or may be fixed by being held in position with a load bar.

The cavities used for molding are oftentimes of standard size often a bowed area somewhere beyond the capline to accommodate various shapes of blades such as the folded-over blade which may be bowed in its midsection.

Most blades are of standard thickness at the capline, determined by prescribed safety specifications usually between .055–.065 thick and so the usual die cavity may be adapted to receive many different types of blades, such as solid stock, or various types of folded-over blades, as long as the capline opening is approximately .060 inch.

For proper molding, it is essential that the blade being molded into a new cap, fits snugly in the mold at the capline. Without the snug fit, the plastic of the cap may run beyond the capline and foul the blade or provide edges which must be trimmed in another operation or not pass safety inspection. The plastic may even render the blade incapable of being insertable into an electric outlet. A leak at the capline may further set loose a torrent of hot plastic spurting out of a mold at high pressure.

The safety standard of .055–.065 of blade thickness has generally resulted in the widespread use of die cavities having standard apertures for blades of about .060 inch thick which satisfactorily accept standard blades and prevent escape of plastic from the mold cavity.

In certain instances safety standards permit the use of very thin stock (less than .030) in the making of fold-over blades for particular uses. While the folded stock may be thin, the blade using this stock must meet certain standards under compression about equal to the .060 standard. Bowing the blade shank of thin stock blades has met this standard in the past, but has usually resulted in a narrow shank at the capline of a mold, thus requiring a new mold for thin stock folded blades.

The use of thin stock folded blades has worked a great economy of cost but in the past some of this economy has been lost because expensive new cavities had to be made to accommodate the blade in order to avoid plastic flow from the mold beyond the capline, or idle machine time alone has proven an expense changing over to new die cavities.

While standards have allowed the use of thin stock, most thin stock blades of the past have not been satisfactory since they have been weak, especially along the capline and easily broken off or bent. Blades of the past have also found it difficult to meet normal compression test thickness which is still substantially the thickness of standard blades.

In United States Patent No. 3,284,758 a solution for this problem was provided. In that patent thin stock blades were provided with transverse ridge lines at the capline. The ridge lines permitted a tight fit of the blade in the mold cavity at the capline in a blade adapted to maintain the standard thickness.

Notwithstanding the solution to a long standing problem in the blade of United States Patent No. 3,284,758, some problems still persisted in the molding of blades in caps. The blades of the 3,284,758 patent had to be made with a great precision so that the transverse ridge lines served as an adequate gate to stem the flow of hot plastic under pressure.

In some instances, plastic breaching one ridge line between the inner folds of the blade would act almost as a lever to spread the blade folds apart and have the hot plastic under pressure spurt past the other ridge lines.

According to the present invention, a new improved capline construction for fold-over electric contact blades is provided which may fit the standard mold cavity and which prevents the outflow of plastic from a mold. A strong fold-over blade is further provided adapted to be made of thin stock and also meet normal compression standard requirements.

It has been found that even where the pressurized hot plastic of molding tends to slip past the metal folds of the present invention, that the plastic tends to cool and form a dike against further flow after flowing a short distance. Thus, by use of the flat folding of the present invention, thin metal blades may be more easily constructed, adaptable to conventional molds with less chance of plastic leakage and require less need for very precise supervision in manufacture to achieve the simple end result.

Although such novel feature or features believed to be characteristic of the invention are pointed out in the claims, the invention and the manner in which it may be carried out, may be further understood by reference to the description following and the accompanying drawings.

Figure 1:
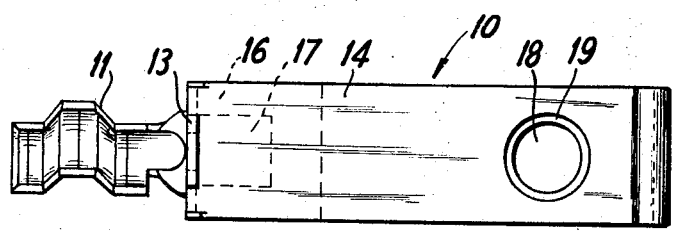
Figure 2:
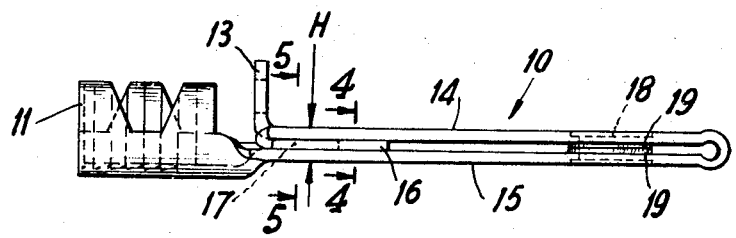
Figure 4:
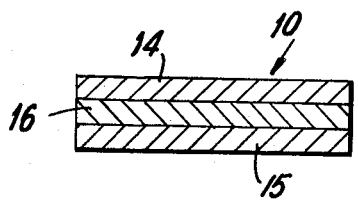
Figure 5:
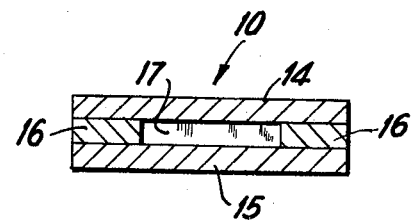
Figure 6:
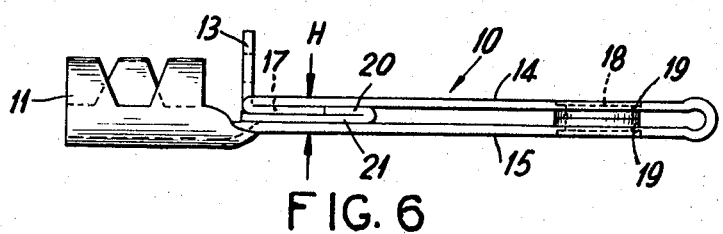
Figure 7:
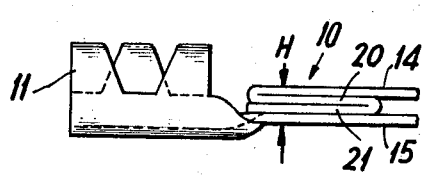
Figure 8:
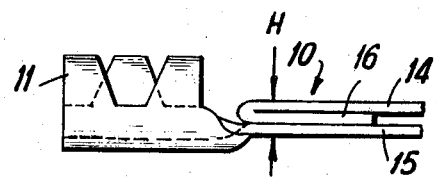
Figure 9:
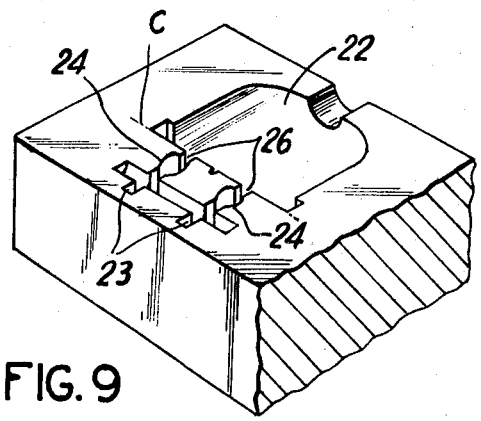
Figure 10:
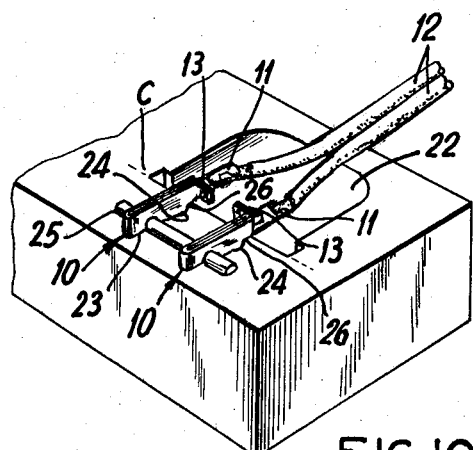

FIG. 1 is a plan view of an embodiment of the present invention.
FIG. 2 is a side elevation of the blade of FIG. 1.
FIG. 3 is an end view of the blade of FIG. 1.
FIG 4 is a section taken at lines 4—4 of FIG. 2.
FIG. 5 is a section taken at lines 5—5 of FIG. 2.
FIG. 6 is another embodiment of the present invention.
FIGS. 7 and 8 are another embodiment of the present invention.
FIG. 9 is an empty cap die cavity.
FIG. 10 is a cap die cavity with a cord set and blades of the present invention ready to be molded into a cap.

Figure 11:
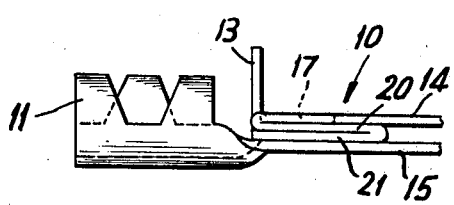

FIG. 11 is another embodiment of the present invention.

Referring now to the figures in greater detail, where like reference numbers denote like parts in the various figures.

The blade 10 as shown in FIGS. 1–5 is provided with a fold-over construction so that the thickness H at the capline is approximately .060 of an inch to meet the required standards. The thickness H usually straddles the capline area of the blade 10 or capline area C of the cavity 22.

The blade 10 is provided with a normal crimping means 11 to join the blade 10 to a conductor wire 12.

As shown in FIGS. 1–3 the blade 10 is provided with a lip 13.

The embodiment of the present invention as shown in FIG. 6 is also provided with a similar lip 13. The lip 13 while not integral to the invention is generally important in the art of molding blades into caps since the lip serves as an anchor holding the blade 10 once molded into a cap against movement or slippage out of the cap.

It has been found economical to have the lip 13 cut out of the pieces of metal folded over to make the blade 10 of the present invention.

In the figures the blade 10 comprises a first blade section 14 extending the shank length, a second blade secon blade section 15 also extending the blade shank length. The sections 14, 15 being folded at one end.

The crimp means 11 is usually integral to one blade section 15 and extends beyond the shank length leaving the crimp means 11 free to accept a conductor wire 10.

At about the point where the crimp means 11 extends from the second blade sections 14 a small area of the first section is provided to fold over to provide the capline configuration of the present invention.

In FIGS. 1–5 it is preferable to have the blade stock approximately .020 of an inch thus when the lip 13 is stamped out of the blade stock of the first section 14 a capline spacer 16 may be folded under forming a capline portion of approximately .060 of an inch, having the folds of the first blade section 14, second blade section 15 and the capline spacer 16.

The capline spacer 16 of the embodiment of FIGS. 1–5 has the lip 13 extending ontward leaving a well or gap 17 open toward the crimp portion 11 of the blade 10. The gap extends only a portion of the length of the capline space 17, as can be seen in section in FIGS. 4 and 5.

The blade 10 of FIGS. 1–5 is best provided with a load bar hole 18 which may be provided with indentations 19 so that the compression width of the blade is maintained at approximately .060 inch where the indentations 19 met so that the standards for the blade are met.

In FIG. 6 the lip 13 is cut out of the first capline spacer fold 20. The capline spacer is provided with a second integral fold 21. In the embodiment of FIG. 6 it is preferable for the blade stock to be approximately .015 of an inch so that the blade sections 14, 15 and spacer folds 20, 21 equal approximately .060 inch. The load bar hole 18 is provided as in blade 10 at FIG. 6. The indentations 19 are extended to maintain the preferred thickness of .060 inch.

The embodiments of the present invention as shown in FIGS. 7 and 8 provide cap line spacing folds 20, 21 and 16 respectively of stock to provide the optimum spacing of .060 of an inch in blades which do not have lips 13.

The embodiment of the present invention shown in FIG. 11 is provided with a lip 13 extended from the first section 14 of the blade 10 leaving an exposed gap 17 extending below the lip 13. As illustrated the capline is made of the four thicknesses of the first and second blade sections 14, 15 and a first and second capline spacer folds 20, 21.

In operation in molding a blade 10 into a cap a pair of blades 10 are placed in a cavity 22. The cavity 22 has openings 23 and 24 for fold blades 10. In FIG. 9 the opening 24 is bowed to accommodate bowed blades 10 so that the cavity 22 may be flexible as to its selection of blades 10 with which it is used. Once the blades 10 have been joined with a load bar 25 they may be held in the cavity 22 firmly in proper position to be molded when the other part of the cavity is closed. The load bar 25 through the load bar hole keeps the blades in position properly oriented at the capline C. The blades 10 are held snugly in the capline openings 26 which are adapted to accommodate blades of approximately .060 inch.

When the plastic of the cap is injected into the cavity 22 very little, if any, of the plastic may pass through closed blade capline openings 26 because of their snug fit.

The blade 10 of FIGS. 1–5 will receive plastic in the gap 17. Once this gap has been filled the plastic tends to flow no further. Any plastic that may go beyond the gap must work against pressure holding the blade 10 in the capline opening. It is difficult for plastic even under great pressure to pass in further.

Plastic to flow further must pass through the flat area of the blade folds which is not only difficult but which tends to cool the plastic by its good surface contact thus preventing any further plastic flow.

In the blade of FIGS. 7, 8 and 11 no opening is presented for plastic flow. Any plastic seepage must be into the blade sections and folds where the plastic cools and and seals. The plastic itself as it tends to seep adds pressure to the blade in the cavity opening 26 making it more difficult for seepage to occur.

It has been found that seepage of plastic if it does occur seldom exceeds 1/32 of an inch in a normal nondefective blade 10.

Any flow into the gap 17 of the blade of FIG. 11 still does not exit from the cavity past the capline C at the capline opening 26 when the blade 10 is normally held.

As can be seen by the configuration of the present invention conventional dies of the past may be used for molding cord sets with caps and blades of the present invention and great savings may be had by the use of a small amount of their stock for the production of an acceptable blade.

The terms and expressions which are employed are used as terms of description; it is recognized, though that various modifications are possible.

Having thus described certain forms of the invention in some detail, what is claimed is:

1. A fold-over electric contact blade for molding into a cap, said contact blade comprising two folded blade sections, the end of the first of said blade sections including wire attaching means, the second blade section near said wire attaching means including a portion shorter than said second blade section and folded along the length of said second blade section to lie substantially parallel to said first and second blade sections at an area normally straddling the capline of a molded cap, and a lip integral to and extending from an intermediate portion of said second section along said folded over portion, the extension of said lip forming a gap between said first and second sections opening towards said wire attaching means.

2. The invention of claim 1 including a lip extending at an angle from said contact blade.

3. The invention of claim 1 including a lip integral to said shorter portion and extending from said contact blade.

4. The invention of claim 1 including a load bar opening.

5. The invention of claim 1 having a stock thickness of approximately .020 of an inch.

6. A fold-over electric contact blade for molding into a cap, said contact blade comprising two folded blade sections, the end of the first of said blade sections including wire attaching means, the second blade section near said wire attaching means including a first portion shorter than said second blade section and folded along the length of said second blade section to lie substantially parallel to said first and second blade sections at an area normally straddling the capline of a molded cap, and a second fold in said shorter portion folded along the length of said blade and said first portion and parallel thereto and normally straddling the capline of a molded cap.

7. The invention of claim 6 including a lip extending from said contact blade.

8. The invention of claim 6 including a lip integral to said shorter portion and extending from said contact blade.

9. The invention of claim 6 having a stock thickness of approximately .015 of an inch.

References Cited

UNITED STATES PATENTS

| 2,309,311 | 1/1943 | Grohsgal. | |
|---|---|---|---|
| 2,869,096 | 1/1959 | Miller | 339—62 |
| 3,397,383 | 8/1968 | Prifogle et al. | 339—252 |

RICHARD E. MOORE, Primary Examiner

J. H. McGLYNN, Assistant Examiner

U.S. Cl. X.R.

339—218, 276